(12) United States Patent
Yamamoto (10) Patent No.: US 7,205,255 B2
(45) Date of Patent: Apr. 17, 2007

(54) ELECTRODE CATALYST FOR FUEL CELL AND METHOD FOR PRODUCTION THEREOF

(75) Inventor: Shinji Yamamoto, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/956,126

(22) Filed: Oct. 4, 2004

(65) Prior Publication Data

US 2005/0075240 A1    Apr. 7, 2005

(30) Foreign Application Priority Data

Oct. 6, 2003 (JP) ............................. 2003-346642
Sep. 17, 2004 (JP) ............................. 2004-270832

(51) Int. Cl.
*H01M 4/88* (2006.01)
*H01M 4/00* (2006.01)
*B01J 21/18* (2006.01)
*B32B 5/16* (2006.01)
*B05D 5/12* (2006.01)

(52) U.S. Cl. ............. 502/101; 502/182; 502/185; 502/527.15; 502/527.24; 428/403; 427/115; 429/40

(58) Field of Classification Search ................ 502/101, 502/182, 185, 527.15, 527.24; 428/403; 427/115; 429/40
See application file for complete search history.

(56) References Cited

U.S. PATENT DOCUMENTS

| | | | | |
|---|---|---|---|---|
| 3,282,735 A | * | 11/1966 | Kring et al. ................ 429/42 |
| 3,899,354 A | * | 8/1975 | Kordesch .................... 429/67 |
| 5,593,934 A | * | 1/1997 | Stonehart ................... 502/326 |
| 5,702,836 A | * | 12/1997 | Ma et al. .................... 429/13 |
| 5,876,867 A | | 3/1999 | Itoh et al. |
| 5,882,723 A | * | 3/1999 | Tsou ......................... 427/125 |
| 6,241,914 B1 | * | 6/2001 | Schleifstein ............... 252/500 |
| 2002/0146614 A1 | * | 10/2002 | Norskov et al. ............ 429/44 |
| 2003/0036476 A1 | * | 2/2003 | Arnold et al. .............. 502/325 |
| 2004/0072061 A1 | * | 4/2004 | Nakano et al. ............. 429/44 |
| 2005/0074612 A1 | * | 4/2005 | Eklund et al. ............. 428/403 |
| 2005/0229744 A1 | * | 10/2005 | Kijima ...................... 75/255 |

FOREIGN PATENT DOCUMENTS

| | | |
|---|---|---|
| JP | 06-007679 | 1/1994 |
| JP | 08-141400 | 6/1996 |
| JP | 2002-289208 | 10/2002 |
| JP | 2003-288905 | * 10/2003 |

* cited by examiner

*Primary Examiner*—J. A. Lorengo
*Assistant Examiner*—Patricia L. Hailey
(74) *Attorney, Agent, or Firm*—McDermott Will & Emery LLP

(57) ABSTRACT

An electrode catalyst for a fuel cell is provided which excels in catalytic activity and catalytic durability. The electrode catalyst for the fuel cell has noble metal-containing particle deposited on an electroconductive carrier and the noble metal-containing particle possesses a core-shell structure comprising a core part formed of a noble metal alloy and a shell part formed of a noble metal layer different in composition from the core par and formed on the periphery of the core part. This core-shell structure enables the catalytic activity and the catalytic durability of the electrode catalyst to be enhanced simultaneously.

16 Claims, 3 Drawing Sheets

ELECTRODE CATALYST FOR FUEL CELL AND METHOD FOR PRODUCTION THEREOF

BACKGROUND OF THE INVENTION

1. Field of the Invention

This invention relates to an electrode catalyst for a fuel cell and a method for the production thereof, and more particularly to an electrode catalyst for a fuel cell possessing a core-shell structure comprising a core part formed of a noble metal alloy and a shell part formed of a noble metal-containing part different in composition from the core part and formed on the periphery of the core part and a method for the production of the electrode catalyst.

2. Description of the Related Art

The hydrogen-oxygen fuel cells are classified based on the kind of electrolyte and the kind of electrode into varying types, which are represented by alkali, phosphoric acid, fused carbonate, solid electrolyte, and solid polymer fuel cell.

As a cathode catalyst for a solid polymer fuel cell or a phosphoric acid fuel cell, for example, a catalyst which has a noble metal inclusive of platinum deposited on carbon black is used. The platinum-deposited carbon black is produced by adding sodium hydrogen sulfite to an aqueous solution of platinum chloride, mixing the resultant with aqueous hydrogen peroxide solution, depositing the consequently educed platinum colloid on carbon black, washing obtained composite, and optionally heat-treating the washed composite. Among them, the feasibility of the solid polymer fuel cell as the power source for an automobile or a stationary device is being tried. Since this fuel cell is required to retain high durability and necessary ability to generate power for a long time, it has been continued various improvements.

The platinum alloy catalyst for use in the phosphoric acid fuel cell, for example, entailed the problem that the platinum alloy catalyst was alloyed only to an approximate degree of 1:0.3, the base metal as a component of the alloy was educed as crystals of a salt, and the base metal component was maldistributed in the catalyst. Then, a method has been proposed which comprises alloying platinum or a platinum alloy in a catalyst by depositing a base metal on the particles of the platinum or platinum alloy thereby decreasing a platinum solo particle or a platinum alloy solo particle and approximating the alloy composition ratio closely to 1:1 as well, and decreasing uneven distribution of the alloy composition ratio in the catalyst and enhancing the liquation resistance and the catalyst activity (JP-A-1994-7679). In the JP-A-1994-7679, a catalyst having platinum or a platinum alloy deposited on carbon powder is dispersed with a supersonic homogenizer while keeping the catalyst immersed and stirred in a hot water, and thereafter electroless plating the dispersed catalyst with one or more members of chromium, manganese, iron, cobalt, nickel, and copper thereby alloying them with the platinum or the platinum alloy in the catalyst. To solve the same problem, another method has been proposed which comprises dispersing a noble metal or noble metal alloy catalyst deposited on a carrier in a hot water thereby preparing a catalyst slurry, introducing a heavy metal-containing electroless plating liquid in the catalyst slurry and executing electroless plating of the slurry therein, and heating the deposited noble metal or noble metal alloy catalyst at a temperature in the range of 850–950° C. thereby alloying the catalyst (JP-A-1996-141400).

Under the conditions for using a fuel cell that requires coexistence of an acid electrolyte and oxygen, the gradual liquation into the electrolyte of not only the base metal not alloyed with platinum but also the base metal in the crystals of the alloy of the base metal and platinum is inevitable. For solving the liquation, a technique has been proposed which comprises mixing a specific base metal and platinum thereby composing an alloy possessing a vacancy type lattice defect structure and depositing this alloy on an electroconductive carbon powder (JP-A-1998-69914). An obtained skeleton catalyst which is produced by selectively removing a base metal component from the crystals of an ally of a specific base metal and platinum, when used as an electrode catalyst for a fuel cell, exhibits high activity and lasting stability.

Further, when such a reformed gas as hydrocarbon or methanol is used as the fuel for a fuel cell, for example, the fuel includes some tens of ppm of carbon monoxide besides hydrogen and carbon dioxide and this carbon monoxide poisons the platinum catalyst of the anode. To preclude such a deterioration of a catalyst, a catalyst that results from alloying ruthenium and platinum is used as a catalyst for the anode. Actually, when this catalyst is used under the operating conditions of an electrolyte type fuel cell, the catalyst shows a slight sign of growth of platinum particles during the use. This phenomenon may be ascribed to the growth of particles due to the mechanism of fusion and precipitation of platinum and to the mutual fusion of platinum particles which is induced by the breakage of junctions between platinum and a carbon material. The growth of particles in the platinum catalyst causes decline of the characteristic properties when the amount of platinum is small. To repress the growth an electrode catalyst for a fuel cell, a particle of a metal which is less oxidizable than platinum under an acidic state is deposited on an electroconductive material and the outer surface of the particle is coated with platinum (JP-A-2002-289208).

SUMMARY OF THE INVENTION

The methods disclosed in JP-A-1994-7679 and JP-A-1996-141400, however, necessitate electroless deposition of nickel and cobalt and suffer from operational complication.

The liquation of $Pt^{2+}$ ions and the cohesion of platinum particles which occur in the cathode with a large oxygen reduction overvoltage entail a decrease in an available electrode surface area and the decline of a cell performance. Even the method taught in JP-A-1998-69914 cannot prevent the liquation of the alloy fully satisfactorily.

Further, since platinum is expensive, it is required to manifest its performance fully satisfactorily in a small amount of deposition. In the invention of JP-A-2002-289208, however, the fine platinum particles grain relatively in the proportion of platinum atoms unsaturated in such coordinates as edges and steps and the oxygen reduction activity per exposed platinum atom largely declines when the diameter of platinum particles decreases below 2.5 nm. Since the price of a noble metal has a large influence to the price of a relevant catalyst, it is required to increase the activity of noble metal per unit weight. In the circumstance, the electrode catalyst for a fuel cell is expected to maintain the ability of power generation for a long time.

A detailed study by the inventors concerning the cathode with a view to attaining the object has resulted in the discovery that by using a noble metal-containing particle which composed by a noble metal-containing alloy for a core part and a noble metal-containing layer different in composition from the core part for a shell part, it is made possible to obtain a catalyst which represses liquation of the added elements and excels in the property of service life. This invention has been perfected on the basis of this discovery. To be specific, the task mentioned above is fulfilled by the following factors.

Firstly, this invention concerns electrode catalyst for a fuel cell having a noble metal-containing particle deposited on an electroconductive carrier, wherein the noble metal-containing particle possesses a core-shell structure comprising a core part formed of a noble metal alloy and a shell part formed of a noble metal-containing layer different in composition from the core part and formed on the periphery of the core part. The noble metal-containing particle mentioned above contains a noble metal and a transition metal, the platinum content in the noble metal-containing particle is in the range of 50–90 atomic %, the platinum content in the shell part is in the range of 80–100 atomic %, and the platinum content in the core part is in the range of 40–90 atomic %. Particularly when the shell part is formed solely of a noble metal, the relevant fuel cell excels in cell performance.

When the noble metal-containing alloy contains platinum and other noble metal for the core part, it is preferable that the platinum content in the noble metal-containing particle is in the range of 40–90 atomic %, the platinum content in the shell part is in the range of 40–90 atomic %, and the platinum content in the core part is in the range of 40–90 atomic %. Where the shell part is formed of platinum and other noble metal, the obtained fuel cell manifests more excellent cell performance.

Secondly, this invention concerns a method for the production of an electrode catalyst for a fuel cell comprising a step of depositing a noble metal-containing particle formed of a noble metal alloy on an electroconductive carrier and a step of exposing the surface of said particle to a solution capable of liquating a component other than noble metal, thereby forming a core-shell structure in said particle. By adjusting the diameter of the noble metal-containing particle, it is made possible to delay the liquation of the noble metal and other components from the catalyst.

DESCRIPTION OF THE PREFERRED EMBODIMENTS

The first aspect of this invention is directed toward an electrode catalyst for a fuel cell having a noble metal-containing particle deposited on an electroconductive carrier, wherein said noble metal-containing particle possesses a core-shell structure comprising a core part formed of a noble metal alloy and a shell part formed of a noble metal-containing layer different in composition from said core part and formed on the periphery of said core part.

Figure 3:
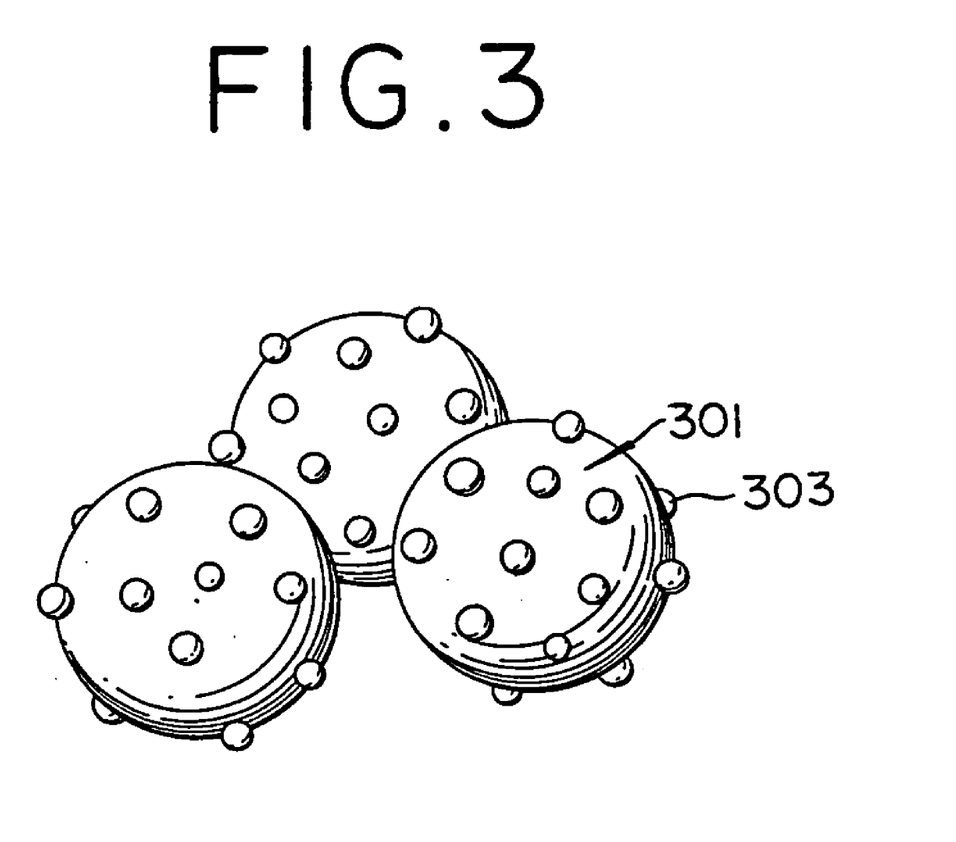
FIG. 3 is a type section of conventional carbon-deposited platinum alloy catalyst particles.

A detailed study conducted in search of the cause for the decline of the performance of noble metal particles in a cathode has resulted in the discovery that the magnitude of the oxygen reduction overvoltage constitutes a main cause for lowering the efficiency of a fuel cell and the property of service life is degraded because the element added to a noble metal is liable to be liquated in a strongly acidic electrolyte whereas the activity is increased due to transformation in the state of the outermost-shell orbital electron in a noble metal. More specifically, while the causes for the liquation of platinum include the conditions of pH and potential, the liquation of platinum degrades the mass activity because the liquated platinum ion is re-educed on the platinum particles and the particle diameter enlarge by sintering. When the platinum ion is precipitated in a membrane, it causes a decrease of proton electrically conductivity and degradation of the membrane chemically and physically, thereby decreasing property of electric power generation and service life of the catalyst. Furthermore, since a component added to noble metal is liable to be liquated in a strongly acidic electrolyte than noble metal, it also entails eduction of the component in the membrane and a decrease of mass activity of the catalyst. FIG. 3 is a type section of a conventional carbon-carried platinum alloy catalyst. In the conventional catalyst, platinum alloy catalyst particles 303 deposited on each carbon carrier 301 have an approximately uniform composition from the surface to the center, and suffer the components other than platinum to liquate conspicuously under the condition of the strongly acidic electrolyte. This invention, therefore, contemplates repressing the liquation of other components than noble metal under the strongly acidic conditions by using the noble metal-containing particle deposited on the electroconductive carrier formed into a core-shell structure which comprises a core part formed of noble metal-containing alloy and a shell part more heightened noble metal content than the core part. According to this design, since an electroconductive carrier such as carbon contacts with a noble metal, which is not easily ionized even with a strongly acidic electrolyte and contains therein a noble metal and a transition metal both excelling in the activity as an electrode catalyst, the liquation of the noble metal as an active component is repressed to enhance the property of service life and, at the same time, keep the cell performance from declining. Further, since the noble metal ions are not migrated into a strongly acidic electrolyte solution, the deterioration of the electrolyte and the membrane can be repressed.

The noble metal in this invention is an element selected from the group consisting of platinum, palladium, rhodium, osmium, ruthenium, iridium and mixtures thereof, and is particularly preferably platinum. The other component which is contained in the noble metal-containing particle is an element which is selected from the group consisting of vanadium, chromium, manganese, iron, cobalt, nickel, copper, zinc and mixtures thereof. When the electrode catalyst of this invention is used for a fuel cell, the transition metal functions in conjunction with the noble metal to add to the catalyst activity.

Incidentally, the term "alloy" is a generic name designating what results from adding a metallic element and one or more metallic elements or nonmetallic elements together and retains a metallic quality. The texture of the alloy is known in various forms such as, for example, a eutectic alloy having component elements form separate crystals and deserving to be called a mixture, a solid solution having the component elements completely solved into each other, and a mixture having the component elements form an intermetallic compound or a compound between a metal and a nonmetal. This invention does not discriminate the alloy on account of the kind of its texture.

When the core part is formed into an alloy of a noble metal and a transition metal, the platinum content in the whole noble-metal containing particles is in the range of 50–90 atomic %, the platinum content in the shell part is. 80–100 atomic %, and the platinum content in the core part is 40–90 atomic %. Particularly preferably, the platinum content in the shell part formed of a noble metal-containing layer is 100%. That is, the catalyst particles have the surface thereof coated with platinum. When the shell part is formed solely of platinum, the liquation of the transition metal in the core part can be effectively repressed even under a particularly strong acidic condition. The expression "the platinum contest in the shell part is 100%" means that the shell part is formed of 100% of Pt and does not contain a platinum compound.

When the shell part is formed into an alloy of a noble metal and a transition metal, the platinum content in the whole noble-metal containing particles is in the range of 40–90 atomic %, the platinum content in the shell part is 40–90 atomic %, and the platinum content in the core part is 40–90 atomic %. When the noble metal-containing particle are formed in a ternary system of a platinum alloy, since the components of the system synergistically act, the system permits selection of the form of adsorption that is particularly favorable for the quaternary electron reaction which adsorbs oxygen in a large amount on the surface of catalyst particles.

The noble metal-containing particle comprise 40–90 atomic % of platinum, 5–30 atomic % of an element represented by X and selected from the group consisting of iridium, rhodium, palladium, ruthenium, and mixtures thereof, and 5–30 atomic % of an element represented by Y and selected from the group consisting of cobalt, nickel, chromium, iron, manganese, and mixture thereof. The platinum/Y atomic ratio in the core part is preferably in the range of 6/1–2/3, more preferably 5/1–2/1, and particularly preferably 5/1–3/1 and the platinum/X atomic ratio in the shell part is preferably in the range of 6/1–2/3, more preferably 5/1–1/1, and particularly preferably 4/1–2/1. If the ratios of platinum/Y and platinum/X in the core part and the shell part deviate from the ranges, the deviations will possibly result in reducing the effect of enhancing the mass activity brought by platinum. In the present invention, the component X is preferred to be iridium and the component Y to be cobalt. Particularly in the state of noble potential, the possibility exists that the water will undergo electrolysis with emission of oxygen molecules and the oxygen molecules will oxidize the carbon black supporting the noble metal-containing particle with emission of carbon dioxide. When an alloy of platinum and iridium is used for the shell part and an alloy of platinum and cobalt is used for the core part, however, particularly the liquation of platinum can be repressed and consequently the generation of carbon dioxide can be repressed because the iridium can repress the liquation of platinum in the shell part and an oxygen molecule generated by electricity of water shifts to low electrical potential. Even in this case, the core part may further contain iridium and the shell part may further contain a cobalt.

Figure 1:
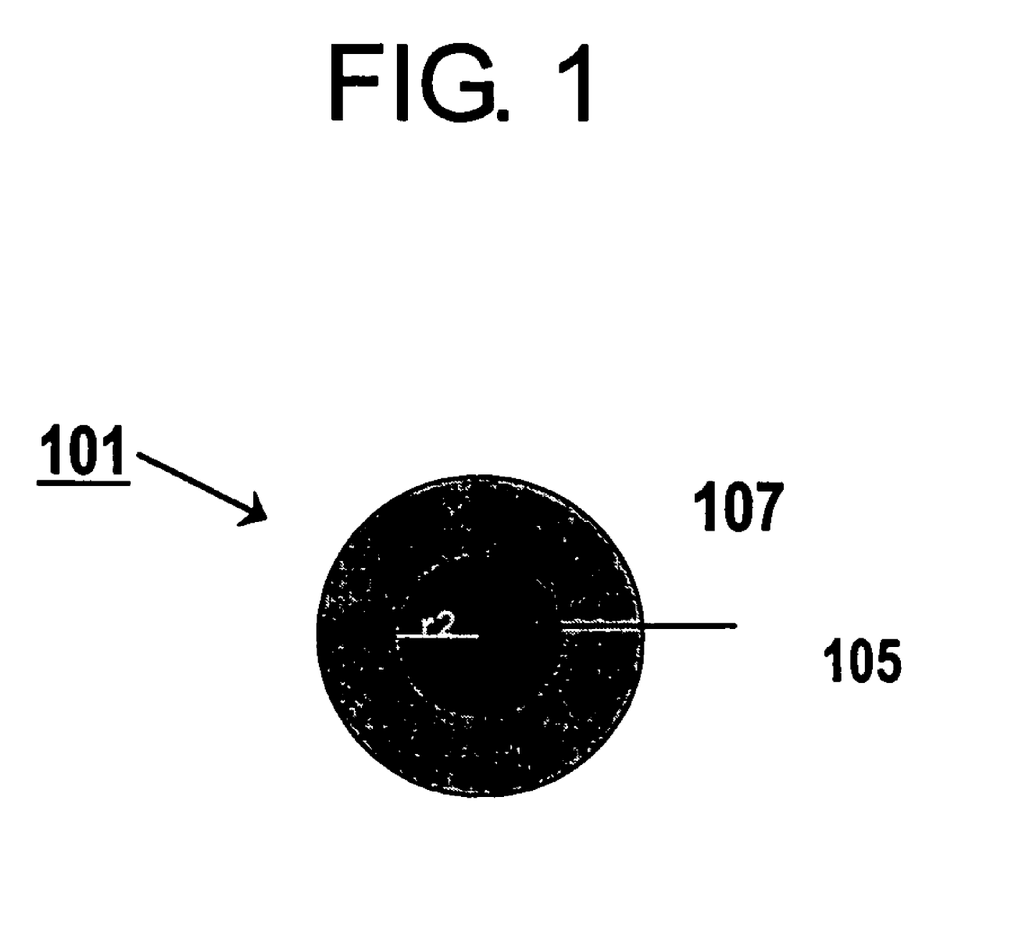
FIG. 1 is a type section illustrating a core part and a shall part of a noble metal-containing particle to be used in an electrode catalyst for a fuel cell of the present invention.

FIG. 1 is type section illustrating a relationship between a core part 105 and a shell part 107 in a noble metal-containing particle (platinum alloy catalyst particle) 101. To repress the liquation of components other than the noble metal from the noble metal-containing particle, it is necessary to prevent a transition metal in the core part from diffusing and suffering to migrate to the surface.

In view of this point, in the noble metal-containing particle, the ratio of the radius of the particles (r1) and the radius of the core (r2), (r1/r2), is preferred to be in the range of 2/1–5/4. If the r1/r2 ratio falls short of 5/4, the shortage will keep the expected prevention of diffusion from being attained fully satisfactorily. If the thickness of the shell part is such that this ratio exceeds 2/1, this overage will possibly result in degrading the catalyst activity. This invention contemplates setting the r1/r2 ratio in the range mentioned above, heat-treating the alloy particles intentionally caused to liquate the added elements thereby densifying the structure of atomic arrangement of the shell part, and consequently repressing the liquation of the noble metal ions. The term "core part" as used in this invention, therefore, means the composition of the central part of each of the noble metal-containing particle and the term "the shell part" means the composition of the outermost layer of each of the noble metal-containing particle.

The noble metal-containing particle mentioned above have an average particle diameter preferably in the range of 1–20 nm, more preferably 2–15 nm, and particularly desirably 2–10 nm. When a bulk metal is finely divided, the resultant metal powder manifests various properties different from the properties of the bulk metal and it as well brings different changes in the electric state and different electric effects due to the interaction with the carrier. A study made regarding the optimal average particle diameter of a catalyst for securing the cell performance exceeding the appropriate level has resulted in the discovery that when noble metal particles have an average particle diameter in the range of 1–20 nm, they excel in resistance to corrosion and resistance to acids, possess a large electrochemical surface area of noble metal, and exhibit a high availability. When, especially, an alloy of a platinum and a transition metal, or an alloy of a platinum and other noble metal is used, the particles having an average particle diameter in the range of 1–20 nm excel in resistance to corrosion and acids, possess a large electrochemical surface area of noble metal and exhibit a high availability because of variations of the outermost-shell orbital electron in the noble metal and reaction facilitatory effect by added components. The average particle diameter of a catalyst metal contemplated by this invention can be computed as the average of a crystal diameter found from the half width of the diffraction peak of a catalyst metal in the X-ray diffraction or of an average particle diameter of a catalyst metal measurable with a transmission electron microscope. Specifically, the particle diameters of the noble metal-containing particle carried on the surface of a carbon carrier are visually observed under a scanning electron microscope (TEM) and then subjected to an image processing which is designed for computation of a particle diameter distribution. During the visual observation of the particles under the TEM, by exposing the noble metal-containing particle to the X-ray and analyzing the energy of the consequently emitted fluorescent X-ray by means of an energy dispersion type (microphotometer) fluorescent X-ray analyzing device (EDX), it is made possible to find the kinds and contents of elements forming the sample and determine the composition on the surface and in the interior of particles. As a result, the question whether iridium, rhodium, palladium and ruthenium represented by X and cobalt, nickel, chromium, iron, and manganese represented by Y are distributed on the surface of the particles or in the interior of the particles can be decided. Further, the crystal face of particulates of such a noble metal as platinum, for example, can be determined from the TEM image and the X-ray diffraction fringe of the particulates.

In the electrode catalyst of this invention for use in the fuel cell, the total amount of the noble metal-containing particle deposited on the electroconductive carrier is preferably in the range of 5–70 wt. %, and more preferably 10–50 wt. %, based on the weight of the electrode catalyst. If the amount of the noble metal-containing particle is less than 5 wt. %, the shortage will prevent the electrode catalyst from manifesting fully satisfactory activity or durability. If this amount is more than 70 wt. %, the overage will render uniform dispersion difficult and allow highly dispersed carriage of the catalyst metal particles only with difficulty.

The electroconductive carrier mentioned above is preferred to be electroconductive carbon particles and particularly carbon black particles having a BET specific surface area in the range of 50–200 $m^2/g$, more preferably 100–1,600 $m^2/$, and especially preferably 200–1,400 $m^2/g$. When the BET specific surface area falls in the range, this conformity is at an advantage in enabling the catalyst component to be highly dispersed on the electroconductive carbon carrier. When the oxidation of the noble metal-containing particle deposited on the electroconductive carbon carrier proceeds, the corrosion of the carbon itself by the oxygen molecules generated by the electrolysis of water mentioned above proceeds. The carbon particles having the surface area mentioned above excel in durability and, owing to this excellent durability coupled with the core-shell structure, further repress the liquation of platinum and allow manufacture of an electrode catalyst of excellent durability for use in the fuel cell. So long as the electroconductive carbon particles have a BET specific surface area in the range mentioned above, they do not need to be particularly discriminated on account of any other condition. Thus, the electroconductive carbon particles which are effectively usable herein may include furnace black, lamp black, acetylene black, channel black, and thermal black, and even those which are called carbon nanohorns, carbon nanotubes, and carbon fibers. Particularly, Vulcan, Ketjen black EC, ketjen black EC 600JD and Black pearl whose BET specific surface areas fall in the range of 200–1,400 $m^2/g$ prove particularly advantageous. An electroconductive carbon black particle carrier that is graphitized by firing such a carbon black at an elevated temperature and having a BET specific surface area in the range of 50–600 $m^2/g$, more preferably 80–400 $m^2/g$, and particularly preferably 100–300 $m^2/g$ can be advantageously used. As concrete examples of the graphitized carbon black, graphitized carbon black EC, graphitized ketjen black EC 600JP, and graphitized black pearl may be cited. Particularly, the graphitized carbon black that has a BET specific surface area in the range of 100–300 $m^2/g$ excels in durability and, therefore, can be advantageously used as a carrier. Incidentally, the carbon particles are preferred to have a particle diameter in the range of 30–100 nm for the purpose of establishing a proper state of contact between the surface of the carbon deposited thereon the noble metal particles and the solid polymer electrolyte.

The electrode catalyst of this invention for use in the fuel cell is favorably used as an electrode catalyst, particularly a cathode catalyst, for a fuel cell. The particles of a noble metal or the particles of an alloy of a noble metal and a transition metal are so deposited on the electroconductive carbon particles as to promote the growth of the Pt (100) crystal faces of the metal particles and acquire a high oxygen reduction activity.

The electrode catalyst according to the first aspect of this invention for fuel cell can be produced by the following method of production which constitutes the second aspect of this invention.

The second aspect of this invention is directed toward a method for the production of an electrode catalyst for a fuel cell comprising a step of depositing a noble metal-containing particle formed of a noble metal alloy on an electroconductive carrier and a step of exposing the surface of said particle to a solution capable of liquating a component other than noble metal, thereby forming a core-shell structure in said particle. According to this method, the solution capable of liquating the component other than the noble metal, but uncapable of causing any change of internal part of the noble metal-containing particle allows easy formation of a core-shell structure having different alloy compositions in the surface layer and the interior of the particles because of inducing the components other than the noble metal to be liquated solely from the surface layer.

The method for depositing the noble metal-containing particle on the electroconductive carrier does not need to be particularly restricted. The noble metal alloy particles prepared in advance may be simply deposited on the electroconductive carrier. This deposition may be attained, for example, by depositing noble metal particles on the electroconductive carrier, then further depositing transition metal particles thereon, and thereafter firing the resultant layers. For example, a method is available which comprises dispersing an electroconductive carrier in a solution containing noble metal particles and transition metal particles, mixing and stirring the resultant dispersion and allowing the dispersed components to react at 70–100° C. for 3–12 hours thereby inducing deposition of the resultant noble metal alloy on the electroconductive carrier. The solution may optionally incorporate therein a reducing agent for the noble metal and a precipitating medium for the transition metal.

As concrete examples of the solution which contains noble metal particles and transition metal particles as described above, a noble metal colloid solution and a transition metal colloid solution may be cited. The deposition of noble metal alloy particles on an electroconductive carrier by the use of this solution is accomplished by dispersing the electroconductive carrier in a noble metal colloid solution, then dispersing a carrier having a noble metal deposited thereon in a transition metal colloid solution thereby inducing deposition of transition metal colloid particles on the surface thereof, and thereafter firing the resultant composite. Consequently, the particles of an alloy of the noble metal and the transition metal are obtained. Alternatively, the noble metal colloid solution and the transition metal colloid solution may be mixed and thereafter the electroconductive carrier may be dispersed in the resultant mixture. Optionally, an aqueous noble metal solution or an aqueous transition metal solution may be used in the place of the colloid solution mentioned above.

The method in this invention does not need to impose any restriction on the kind of noble metal. It is proper to use an element selected from the group consisting of platinum, palladium, rhodium, osmium, ruthenium, iridium and mixtures thereof in respect that this noble metal, when manufactured into an electrode catalyst for a fuel cell, excels in catalyst activity. Among other noble metals, platinum, palladium, and/or iridium are used particularly advantageously. The source of supply of such a noble metal is not particularly restricted. A wide variety of compounds which contain the noble metal may be relied on as the sources of supply. As concrete examples of these compounds, nitrates such as rhodium nitrate, halogenides such as palladium chloride and platinum chloride, ammine complexes such as dinitrodiamine palladium, tetraamine palladium (II) nitrate, and tetraammine palladium (II) chloride hydrate, sulfates such as palladium sulfate and rhodium sulfate, acetates such as palladium acetate and rhodium acetate, and other compound may be cited. They may be properly selected to suit the kind and pH of a solvent to be used for solution. Among other compounds, nitrates, carbonates, oxides, and hydroxides are advantageously used commercially. The noble metal ion concentration is preferably in the range of 0.1–50 wt. % and more preferably 1–30 wt. % as reduced to metal. The preparation of a noble metal colloid solution is attained by adding a reducing agent.

As concrete examples of the reducing agent for a noble metal, hydrogen, hydrazine, sodium hydrogen borate, sodium thiosulfate, citric acid, sodium citrate, L-ascorbic acid, sodium boron hydride, formaldehyde, methanol, ethanol, ethylene, and carbon monoxide may be cited. Such a reducing agent as hydrazine which can be prepared in the form of an aqueous solution may be directly added to the solution in the form of an aqueous solution of a concentration of 0.1–30 wt. %. Such a powdery reducing agent as sodium hydrogen boride may be supplied in its unmodified form. Such a gaseous reducing agent as hydrogen may be supplied by means of bubbling.

The "transition metal" in this invention is an element which is selected from the group consisting of vanadium, chromium, manganese, iron, cobalt, nickel, copper, zinc and mixture thereof. As concrete examples of the source of supply of such a transition metal as mentioned above, inorganic salts such as nitrates, sulfates, ammonium salts, amines, carbonates, bicarbonates, halogenides, nitrites, and oxalates, and carboxylates such as formates, hydroxides, alkoxides, and oxides may be cited. They may be properly selected to suit the kind and pH of a solvent used for solution. By using a noble metal alloy formed of a noble metal and a transition metal, it is made possible to enhance the catalyst activity further. Particularly the use of a transition metal is at an advantage in enabling the mass activity (the activity per unit weight of a relevant noble metal) to be enhanced. The mixing ratio of the noble metal and the transition metal may be adjusted so as to acquire a necessary noble metal alloy ratio.

As concrete examples of the precipitating medium for a transition metal, ammonia, aqueous ammonia, and tetramethyl ammonium hydroxide may be cited. Aqueous ammonia or tetramethyl ammonium hydroxide may be directly added to the solution in the form of an aqueous solution of a concentration of 0.1–30 wt. %.

The electroconductive carrier which can be used in this invention is the same as described above in connection with the first aspect of this invention. For the purpose of uniformly dispersing noble metal particles, the carbon particles are preferred to have a particle diameter in the range of 30–100 nm. Preferably, the electroconductive carbon particles have been washed with an alkali solution such as the solution of sodium hydroxide, potassium hydroxide, or calcium hydroxide to have the surface thereof purged of any adhering defiling substance.

The deposition of noble metal particles by the use of the solution mentioned above is attained by adding the solution and a relevant reducing agent together, dispersing an electroconductive carrier in the resultant mixture, mixing and stirring them together, and retaining them at a temperature in the range of 70–100° C. and preferably 80–95° C. If this temperature falls short of 70° C., the shortage will be at a disadvantage in preventing the reaction of reduction from being promoted and also preventing the noble metal from being deposited in a sufficient amount. If the temperature exceeds 100° C. conversely, the overage will result in inducing the aqueous solution to boil and consequently rendering the operation difficult to perform. The reaction time which is required for the deposition of the noble metal or the noble metal alloy on the electroconductive carrier is properly in the range of 3–24 hours and preferably 6–12 hours. When iridium, for example, is incorporated other than platinum as a noble metal, the addition of a reducing agent for platinum ions may be accomplished by adding a solution containing iridium ions and a reducing agent for iridium ions together and mixing a solution containing platinum ions with the resultant solution. The same holds good with a transition metal.

The deposition of noble metal alloy particles is accomplished by depositing a transition metal further on an electroconductive carrier on which noble metal particles have been deposited. To be specific, it is effected by adding a transition metal-containing solution and a relevant precipitating medium, dispersing in the resultant solution an electroconductive carrier having a noble metal deposited in advance, mixing and stirring them together and heating them at a temperature in the range of 30–100° C. and preferably 30–50° C. If the temperature falls short of 30° C., the shortage will result in adversely affecting the promotion of the reaction of precipitation. If the temperature exceeds 100° C., the overage will induce the aqueous solution to boil and render the operation difficult to perform. The reaction time which is required for further depositing a transition metal on the electroconductive carrier is properly in the range of 1–12 hours and preferably 3–6 hours.

The deposition of noble metal alloy particles may be accomplished by first depositing transition metal particles on an electroconductive carrier and further depositing a noble metal thereon. To be specific, this deposition is attained by mixing a transition metal-containing solution with an electroconductive carrier, then adding a relevant reducing agent thereto thereby inducing deposition of the transition metal particles on the electroconductive carrier, then performing the filtering, drying, and firing steps, and consequently obtaining the electroconductive carrier having the transition metal particles deposited thereon. A noble metal solution, an electroconductive carrier having transition metal particles deposited therein, and a relevant reducing agent are added together, mixed and stirred together, and heated.

The formation of a shell part differing in composition from the core part in the catalyst particles is accomplished by exposing the catalyst particles to the action of aqua regia, nitric acid, or concentrated sulfuric acid thereby expelling the component other than noble metal by liquation. In this case, for the purpose of adjusting the platinum/X ratio in the shell part in the range of 6/1–2/3 and the ratio of the radius of the particles (r1) and the core radius (r2), (r1/r2), in the range of 2/1–5/4, it suffices to adjust the duration of the action of concentrated sulfuric acid, for example, the temperature of the solution, and the amount of addition.

The electroconductive carrier which has a noble metal alloy deposited therein is separated from the reaction solution by the method of centrifugation, filtration, or washing, then washed, and dried. The drying may be effected by natural seasoning or evaporation to dryness or by the use of a rotary evaporator, a spray drier, or a drum drier. The duration of this drying may be properly selected to suit the kind of method adopted for the drying. When necessary, the drying step may be omitted and the drying may be performed at the firing step. The product of this drying is finely divided to obtain a precursor to an electrode catalyst and the precursor is fired in the presence of an inert gas and an oxidizing gas. The precursor to the electrode catalyst is enabled to form an electrode catalyst formed of a noble metal by the firing at a lower temperature than the firing of a metal salt or the firing of a certain kind of organic acid salt. When the carrier comprises electroconductive carbon particles, the heating and the firing are carried out in an inert (non-oxidizing) atmosphere of argon, nitrogen, or helium lest the oxidation of carbon should proceed. Specifically, it is proper to carry out the firing step in the atmosphere of an inert gas at a temperature in the range of 200–1100° C. and preferably 200–800° C. and thereafter performing the step of retaining the fired product at a temperature in the range of 200–600° C. and preferably 200–400° C. If this temperature exceeds 1100° C., the overage will possibly induce migration of the elements of the core part to the surface.

The formation of the core-shell structure may be effected without using the solution which is capable of liquating the components other than the noble metal as mentioned above. For example, the precursor to the electrode catalyst may be obtained by depositing noble metal alloy particles on an electroconductive carrier, impregnating the resultant carrier sequentially in a solution resulting from adding a reducing agent to a noble metal-containing solution and/or a solution resulting from adding a precipitating medium to a transition metal-containing solution, thereby further depositing a noble metal and a transition metal on the noble metal alloy particles, thereafter separating the resulting noble metal alloy particles from the solution by the steps of centrifugation, filtration, and washing, then washing and drying the separated particles. This precursor to the electrode catalyst is fired in an inert (non-oxidizing) atmosphere of argon or nitrogen lest the oxidation of carbon should proceed. The firing is preferred to be performed in the atmosphere of an inert gas at a temperature in the range of 200–1100° C. and preferably 200–800° C. and then followed by a step of retaining the product of this firing at a temperature in the range of 200–600° C. and preferably 200–400° C.

The method of production contemplated by this invention allows the average particle diameter of a catalyst and the thickness of a shell part to be adjusted by using a reversed micellar solution in the formation of a core part and a shell part. The use of the reversed micellar solution allows efficient deposition of fine noble metal particles and enables the utilization ratio of a noble metal in an electrode for a fuel cell to be enhanced.

For example, the core-shell structure comprising a core part and a shell part different in composition from the core part is obtained by adding a reversed micellar solution (A) containing an aqueous solution of noble metal ions in the micelle thereof and a reducing agent for the noble metal ions, then mixing the resultant solution with a reversed micellar solution (B) containing an aqueous solution of transition metal ions in the micelle thereof, adding to the resultant solution a precipitating medium for the transition metal ions, dispersing an electroconductive carrier in the solution and inducing deposition of a noble metal alloy on the electroconductive carrier, and then exposing the resultant composite to the action of a solution capable of liquating the components of the alloy existing on the surface of the catalyst particles other than the noble metal. As a result, the component of the noble metal existing on the surface of the noble metal-containing particle is liquated to complete a core-shell type noble metal-containing particle which have different compositions in a core part and a shell part. The incorporation of iridium, for example, as a noble metal other than platinum may be accomplished by adding a reversed micellar solution ($A_1$) containing iridium ions and a reducing agent for iridium ions, mixing the resultant solution with a reversed micellar solution ($A_2$) containing platinum ions, and adding thereto a reducing agent for platinum ions. When a plurality of transition metal ions are used, it suffices to use similarly reversed micellar solutions ($B_1$) and ($B_2$) containing different transition metal ions and reducing agents thereof. The term "reversed micellar solution" as used in this invention means a solution which contains micelles formed by the aggregation of an amphoteric substance resulting from the mixture of an organic solvent with such an amphoteric substance as surfactant molecules and further contains in the micelles an aqueous solution of noble metal ions and/or an aqueous solution of transition metal ions. In the organic solvent phase, the hydrophobic group is oriented outwardly or toward the organic solvent phase side and the hydrophilic group is oriented inwardly. Thus, the orientations of the hydrophobic group and the hydrophilic group are reversed from those in the aqueous solvent phase. Hence, the designation "reversed micellar solution" is adopted.

In the electrode catalyst of this invention for use fuel cell, the solution containing noble metal ions is added as the reversed micellar solution. The size of the micelle can be properly adjusted to suit the solvent to be used, the kind of the surfactant, and the amount of addition thereof. When a reversed micellar solution having a micelle diameter in the range of 20–100 nm and electroconductive carbon particles as an electroconductive carrier are added together, micelles uniformly adhere to the surface of the carbon particles. When this carrier is fired, electrode catalysts which are uniformly deposited on the surface of the carrier at intervals in the range of 10–50 nm between the adjacent metal particles are obtained. The conventional method induces aggregation of platinum or a platinum alloy and renders control of the average particle diameter and the particle distribution difficult. This invention enables this control to be carried out very conveniently and infallibly.

As the organic solvent which can be used for the formation of reversed micelles, various substances are available. As concrete examples of the organic solvent, cyclohexane, methyl cyclohexane, cycloheptane, heptanol, octanol, dodecyl alcohol, cetyl alcohol, isooctane, n-heptane, n-hexane, n-decane, benzene, toluene, and xylene may be cited. For the purpose of adjusting the size of water drops in the reversed micellar solution, an alcohol may be additionally used. The organic solvents may be used either singly or in the form of a mixture of two or more members. The organic solvent can be used for the preparation of the reversed micellar solution (A) and the reversed micellar solution (B). When the reducing agent for noble metal ions and the precipitating medium for transition metal ions are supplied each in the form of a reversed micellar solution, the organic solvent can be used for the preparation of this solution. In this case, the organic solvent used in either of the reversed micellar solutions and the organic solvent used in the other reversed micellar solution may be identical to or different from each other.

As concrete examples of the surfactant for forming the reversed micellar solution, polyoxyethylene nonylphenyl ether, magnesium laurate, zinc caprate, zinc myristate, sodium phenyl stearate, aluminum dicaprylate, tetraisoamyl ammonium thiocyanate, n-octadecyl tri-n-butyl ammonium formate, n-amyltri-n-butyl ammonium iodide, sodium bis(2-ethylhexyl) succinate, sodium dinonyl napthalene sulfonate, calcium cetyl sulfate, dodecyl amine oleate, dodecyl amine propionate, cetyl trimethyl ammonium bromide, stearyl trimethyl ammonium bromide, cetyl trimethyl ammonium chloride, stearyl trimethylammonium chloride, dodecyl trimethyl ammonium bromide, octadecyl trimethyl ammonium bromide, dodecyl trimethyl ammonium chloride, octadecyl trimethyl ammonium chloride, didodecyl dimethyl ammonium bromide, ditetradecyl dimethyl ammonium bromide, didodecyl dimethyl ammonium chloride, ditetradecyl dimethyl ammonium chloride, and (2-octyloxy-1-octyloxymethyl) polyoxyethylene ethyl ether may be cited. The surfactant can be used for the preparation of either of the reversed micellar solutions. The surfactants can be used either singly or in the form of a mixture of two or more members. The amount of the surfactant to be added to the organic solvent is in the range of 10–300 wt. parts, based on 100 weight parts of the organic solvent. If the amount of the surfactant to be added falls short of 10 wt. parts, the shortage will render the formation of the reversed micelles difficult. Conversely, if this amount exceeds 300 wt. parts, the overage will be at a disadvantage in forming micelles of the shape of rods and preventing the average particle diameter of noble metal from being controlled and collected to a specific size.

The method of this invention imposes no restriction on the kind of noble metal ions and can use any of the noble metals enumerated above. The noble metal ion concentration is properly in the range of 0.1–50 wt. % and preferably 0.5–20 wt. % as reduced to metal. The reducing agents which are usable for the noble metal ions are the same as those mentioned above. The transition metal ions and the precipitating media usable herein are the same as those mentioned above.

As regards the sequence of addition of the reversed micellar solution (A), the reversed micellar solution (B), the reducing agent, and the precipitating medium, the addition of the reducing agent to the reversed micelles (A) results in converting noble metal ions into noble metal particles and the addition of the precipitating medium to the reversed micellar solution (B) results in converting transition metal ions into transition metal particles. Besides (i) a method which comprises adding the reversed micellar solution (A) and the precipitating medium together, adding the reversed micellar solution (B) to the resultant solution, and then adding the precipitating medium thereto, (ii) a method which comprises first adding the reducing agent to the mixed solution of the reversed micellar solution (A) and the reversed micellar solution (B) and subsequently adding the precipitating medium to the resultant solution, (iii) a method which comprises first adding the precipitating medium to the mixed solution of the reversed micellar solution (A) and the reversed micellar solution (B) and subsequently adding the reducing agent to the resultant solution, and (iv) a method which comprises adding the reversed micellar solution (B) and the precipitating medium together, then adding the reversed micellar solution (A) to the resultant solution, and further adding the reducing agent thereto are available. In this case, when the electroconductive carrier is added to the solution which has resulted from undergoing any of the steps (i)–(iv) and when a transition metal is additionally used, the particles of the two metals are compounded within the micelles and the compounded particles adhere to the surface of the carrier. This invention does not need to be limited to this mode of addition and allows the addition to be made to any of the preceding steps. Preferably, the reversed micellar solution (A) and the electroconductive carrier are added and mixed together to form a homogeneous solution and the solutions mentioned above are sequentially added thereto. When the carrier mentioned above is added to the reversed micellar solution (A), the micelle which possesses an aqueous solution of noble metal ions in the interior thereof adhere uniformly to the surface of the carrier and, the reducing agent are added to while remaining the adhered state, therefore the noble metal particles can be deposited on the surface of the carrier while they are allowed to retain the dispersibility thereof. After the reversed micellar solution (A) and the carrier are added together, the micelle is fractured and the deposition of heavy metal particles on the surface of the carrier is promoted by the addition of an alcohol such as methanol or ethanol.

After the electroconductive carrier has been added to the reversed micellar solution (A) and/or the reversed micellar solution (B), it is preferable to mix and stir the resultant solution, allow the reaction to proceed at 70–100° C. for 3–12 hours, and consequently induce deposition of a noble metal or a noble metal alloy on the electroconductive carrier. Under these conditions, the deposition of the noble metal particles on the surface of the carrier can be effected infallibly.

In the method of production contemplated by this invention, the formation of catalyst particles having a particle radius (r1) in the range of 1–20 nm is attained by adjusting the concentration of noble metal, the concentration of a transition metal, and the average particle diameter of the reversed micelle during the preparation of the reversed micellar solution. When the noble metal ions and the transition metal are added to the resultant solution, they are aggregated into spheres, depending on the shape of the reversed micelle, and transformed into catalyst particles having an average particle diameter in the range of 2–8 nm.

Electrode catalyst for a fuel cell in the present invention is useful to alkali, phosphoric acid, fused carbonate, solid electrolyte and solid polymer fuel cell, and preferably to solid polymer fuel cell.

EXAMPLES

Now, this invention will be described specifically below with reference to working examples. This invention does not need to be limited to these working examples. In these working examples, the symbol "%" is to be construed as representing weight percent unless otherwise specified.

Example 1

The amount, 4.0 g, of a highly electroconductive carbon black (a product having a BET surface area of 800 m$^2$/g, made by Ketjen Black International Corp. and sold under the trademark designation of "Ketjen Black EC"), 8.1 g of an aqueous solution of cobalt nitrate (Co(NO$_3$)$_2$.6H$_2$O), and 400 g of an aqueous solution of dinitrodiammine platinum (Pt concentration 1.0%) were added together and stirred for one hour and then mixed with 200 g of ethanol and 1 g of sodium hydrogen boride and stirred for one hour. The resultant mixture was heated to 85° C. over a period of 30 minutes, further stirred and mixed at 85° C. for six hours, and then allowed to cool to room temperature over a period of one hour. The produced solution and 10 g of an aqueous 5% tetramethyl ammonkium hydroxide solution were added thereto and stirred together for one hour.

The precipitate was separated by filtration and the resultant solid was dried under a reduced pressure at 85° C. for 12 hours. Then, the dried product was ground in a mortar to obtain a catalyst (hereinafter referred to as "Catalyst (A)"). This catalyst (A) comprised Pt alloy particles having an average particle diameter of 4.0 nm. The concentration of Pt deposited was 50% based on the weight of the catalyst (A) and the composition ratio of the Pt alloy particles (atomic ratio, the same applies hereinafter) was Pt$_{0.75}$Co$_{0.25}$.

Subsequently, this catalyst (A) was fired in an atmosphere of an inert gas stream at 600° C. for one hour.

Further, the resultant catalyst (A) powder was suspended for two hours in 100 g of a concentrated sulfuric acid (0.5M) solution heated in advance to 50° C. The resultant precipitate was separated by filtration and the solid consequently obtained was dried under a reduced pressure at 85° C. for 12 hours. Catalyst particles resulting from liquation of cobalt from the surface of the catalyst particles were obtained. The compositions of catalyst particles obtained in the working examples and comparative examples are shown in Table 1 and Table 2.

Example 2

A catalyst comprising Pt alloy particles having an average particle diameter of 3.5 nm, a deposited Pt concentration of 50%, and a composition ratio of $Pt_{0.75}Co_{0.25}$ was obtained by following the procedure of Example 1 and using a highly electroconductive carbon black (a product having a BET surface area of 1270 m$^2$/g, made by Ketjen Black International Corp. and sold under the trademark of "Ketjen Black EC600JD"). The catalyst powder was suspended for one hour in 100 g of a concentrated sulfuric acid (0.5M) solution heated in advance to 50° C. to obtain catalyst particles having cobalt liquated from the surface of catalyst particles.

Example 3

A catalyst comprising Pt alloy particles having an average particle diameter of 3.5 nm, a deposited Pt concentration of 50%, and a composition ratio of $Pt_{0.75}Co_{0.25}$ was obtained by following the procedure of Example 1 and using a highly electroconductive carbon black (a product having a BET surface area of 1270 m$^2$/g, made by Ketjen Black International Corp. and sold under the trademark of "Ketjen Black EC600JD"). The catalyst powder was suspended for one hour in 100 g of a concentrated sulfuric acid (0.5M) solution heated in advance to 35° C. to effect liquation of cobalt on the surface of catalyst particles. This procedure was performed up to three repetitions. The resultant precipitate was separated by filtration and the solid consequently obtained was dried under a reduced pressure at 85° C. for 12 hours to obtain catalyst particles.

Example 4

A homogenous aqueous solution was prepared by adding 0.7 g of an aqueous solution of cobalt nitrate (Co(NO$_3$)$_2$·6H$_2$O) (cobalt concentration 5%), 31.9 g of an aqueous solution of iridium chloride (IrCl$_2$) (iridium concentration 1.0%), 64.8 g of an aqueous solution of dinitridiamminplatinum (Pt concentration 1.0%) and 0.2 g of polyvinyl pyrrolidone having a number average molecular weight of 25,000 together and stirring them for one hour. This solution and 200 g of ethanol added thereto were mixed and stirred for one hour. The resultant mixture was heated to 85° C. over a period of 30 minutes, further stirred and mixed at 85° C. for six hours, and thereafter cooled to room temperature over a period of one hour. Thus, a Pt—Ir—Co complex colloid ($Pt_{0.6}Ir_{0.3}Cu_{0.1}$) solution was obtained.

The Pt—Ir—Co complex colloid solution and 6.0 g of carbon black (a product having a BET surface area of 800 m$^2$/g, made by Ketjen Black International Corp. and sold under the trademark designation of "Ketjen Black EC") were heated together to 50° C. over a period of 30 minutes while the mixture was kept bubbled with hydrogen gas. They were further stirred and mixed at 50° C. for six hours and then cooled to room temperature over a period of one hour. The resultant precipitate was separated by filtration and the solid consequently obtained was dried under a reduced pressure at 85° C. for 12 hours. The dried catalyst powder consequently formed was fired in an atmosphere of an inert gas stream at 600° C. for one hour. Then, the dried product was ground in a mortar to obtain a catalyst having a composition ratio of $Pt_{0.6}Ir_{0.3}Co_{0.1}$.

Subsequently, this catalyst and 500 g of an aqueous solution of dinitridiamminplatinum (Pt concentration 1.0%) were mixed and then dried under a reduced pressure at 85° C. for 12 hours. The dried catalyst powder consequently formed was fired in an atmosphere of an inert gas stream at 300° C. for one hour. Thus, a catalyst comprising Pt alloy particles having an average particle diameter of 4.5 nm, having a deposited Pt alloy concentration of 50%, and comprising a shell part having a composition ratio of $Pt_{1.0}$ and a core part having a composition ratio of $Pt_{0.6}Ir_{0.3}Co_{0.1}$.

Example 5

A catalyst comprising Pt alloy particles having an average particle diameter of 4.5 nm, a deposited Pt alloy concentration of 50%, and having a composition ratio of $Pt_{0.6}Rh_{0.3}Co_{0.1}$ was obtained by following the procedure of Example 4 while using an aqueous solution of rhodium chloride in the place of the aqueous solution iridium chloride.

Example 6

A homogenous aqueous solution was prepared by adding 8.1 g of an aqueous solution of cobalt nitrate (Co(NO$_3$)$_2$·6H$_2$O) (cobalt concentration 5%), 400 g of an aqueous solution of dinitridiamminplatinum (Pt concentration 1.0%), and 4.0 g of polyvinyl pyrrolidone having a number average molecular weight of 25,000 together and stirring them for one hour. This solution and 200 g of ethanol and 5 g of sodium hydrogen boride added thereto were mixed and stirred for one hour. The resultant mixture was heated to 85° C. over a period of 30 minutes, further stirred and mixed at 85° C. for six hours, and thereafter cooled to room temperature over a period of one hour. Thus, a Pt—Co complex colloid ($Pt_{0.75}Co_{0.25}$) solution was obtained The Pt—Co complex colloid solution and 4.0 g of carbon black (a product having a BET surface area of 800 m$^2$/g, made by Ketjen Black International Corp. and sold under the trademark designation of "Ketjen Black EC") were heated together to 50° C. over a period of 30 minutes while the mixture was kept bubbled with hydrogen gas. They were further stirred and mixed at 50° C. for six hours and then cooled to room temperature over a period of one hour. The resultant precipitate was separated by filtration and the solid consequently obtained was dried under a reduced pressure at 85° C. for 12 hours. Then, the dried product was ground in a mortar to obtain a catalyst comprising Pt alloy particles having an average particle diameter of 4.5 nm, a deposited concentration of 50%, and having a composition ratio of $Pt_{0.75}Co_{0.25}$.

Subsequently, this catalyst was fired in an atmosphere of an inert gas current at 600° C. for one hour.

Further, the catalyst powder was suspended in 100 g of a solution of concentrated sulfuric acid (0.5M) heated in advance to 50° C. The resultant precipitate was separated by filtration and the solid consequently obtained was dried under a reduced pressure at 85° C. for 12 hours. This procedure was performed up to two repetitions to liquate cobalt on the surface of the catalyst particles and obtain catalyst particles.

Examples 7–15

Catalyst particles of Examples 7–15 were obtained by following the procedure of Example 6 while using carbon blacks shown in Table 1 in the place of Ketjen Black EC.

Examples 16–18

Catalyst particles of Examples 16–18 were obtained by following the procedure of Example 6 while using aqueous solutions of nitrates of metals shown in Table 1 in the place of the aqueous solution of cobalt nitrate.

Example 19

A homogenous aqueous solution was prepared by adding 1.8 g of an aqueous solution of cobalt nitrate (Co(NO$_3$)$_2$.6H$_2$O) (cobalt concentration 5%), 90 g of an aqueous solution of dinitridiamminplatinum (Pt concentration 1.0%), and 0.2 g of polyvinyl pyrrolidone having a number average molecular weight of 25,000 together and stirring them for one hour. This solution and 200 g of ethanol and 0.2 g of sodium hydrogen boride added thereto were mixed and stirred for one hour. The resultant mixture was heated to 85° C. over a period of 30 minutes, further stirred and mixed at 85° C. for six hours, and thereafter cooled to room temperature over a period of one hour. Thus, a Pt—Co complex colloid (Pt$_{0.75}$Co$_{0.25}$) solution was obtained.

The Pt—Co complex colloid solution (Pt$_{0.75}$Co$_{0.25}$) and 375 g of an aqueous solution of dinitrodiamminplatinum (Pt concentration 1.0%), 125 g of an aqueous solution of iridium chloride (IrCl$_2$) (iridium concentration 1.0%), and 1.0 g of polyvinyl pyrrolidone having a number average molecular weight of 25,000 were added together and stirred for one hour to prepare a homogeneous aqueous solution. This solution and 200 g of ethanol and 0.5 g of sodium hydrogen boride were mixed together and stirred for one hour. The resultant solution was heated to 85° C. over a period of 30 minutes, further stirred and mixed at 85° C. for six hours, and thereafter cooled to room temperature over a period of one hour to obtain a complex colloid.

This complex colloid solution and 6.0 g of carbon black (a product having a BET surface area of 800 m$^2$/g, made by Ketjen Black International Corp. and sold under the trademark designation of "Ketjen Black EC") were heated together to 50° C. over a period of 30 minutes while the mixture was kept bubbled with hydrogen gas. They were further stirred and mixed at 50° C. for six hours and then cooled to room temperature over a period of one hour. The resultant precipitate was separated by filtration and the solid consequently obtained was dried under a reduced pressure at 85° C. for 12 hours. The dried catalyst powder consequently formed was fired in an atmosphere of an inert gas stream at 600° C. for one hour. Then, the dried product was ground in a mortar to obtain a catalyst comprising Pt alloy particles having an average particle diameter of 5.0 nm, a deposited Pt alloy concentration of 50%, and having a core part composition ratio of Pt$_{0.75}$Co$_{0.25}$ and a shell part composition ratio of Pt$_{0.75}$Ir$_{0.25}$.

Example 20

Catalyst particles of Example 20 were obtained by following the procedure of Example 19 while changing the amount of the aqueous solution of dinitrodiammineplatinum (Pt concentration 1.0%) added to the Pt—Co complex colloid (Pt$_{0.75}$Co$_{0.25}$) to 200 g and the amount of the aqueous solution of iridium chloride (IrCl$_2$) (iridium concentration 1.0%) to 200 g.

Examples 21–24

Catalyst particles of Examples 21–24 were obtained by following the procedure of Example 19 while using palladium nitrate (Example 21), rhodium chloride (Example 22), iridium nitrate (Example 23) and iridium nitrate (Example 24) in the place of the aqueous solution of iridium chloride.

Examples 25 and 26

Catalyst particles of Examples 25 and 26 were obtained by following the procedure of Example 19 while using aqueous solutions of nitrates of metals shown in Table 2 in the place of the aqueous solution of cobalt nitrate.

Examples 27–31

Catalyst particles of Examples 27–31 were obtained by following the procedure of Example 19 while using carbon blacks shown in Table 2 in the place of Ketjen Black EC.

Example 32

A homogenous aqueous solution was prepared by adding 8.1 g of an aqueous solution of cobalt nitrate (Co(NO$_3$)$_2$.6H$_2$O) (cobalt concentration 5%), 131 g of an aqueous solution of iridium chloride (IrCl$_2$) (iridium concentration 1.0%), 400 g of an aqueous solution of dinitridiamminplatinum (Pt concentration 1.0%), and 0.2 g of polyvinyl pyrrolidone having a number average molecular weight of 25,000 together and stirring them for one hour. This solution and 200 g of ethanol added thereto were mixed and stirred for one hour. The resultant mixture was heated to 85° C. over a period of 30 minutes, further stirred and mixed at 85° C. for six hours, and thereafter cooled to room temperature over a period of one hour. It and 10 g of an aqueous solution of 5% tetramethyl ammonium hydroxide added thereto were stirred for one hour. Thus, a Pt—Ir—Co complex colloid (Pt$_{0.6}$Ir$_{0.2}$Co$_{0.2}$) solution was obtained.

The Pt—Ir—Co complex colloid solution and 5.5 g of carbon black (a product having a BET surface area of 800 m$^2$/g, made by Ketjen Black International Corp. and sold under the trademark designation of "Ketjen Black EC") were heated together to 50° C. over a period of 30 minutes while the mixture was kept bubbled with hydrogen gas. They were further stirred and mixed at 50° C. for six hours and then cooled to room temperature over a period of one hour. The resultant precipitate was separated by filtration and the solid consequently obtained was dried under a reduced pressure at 85° C. for 12 hours. The dried catalyst powder consequently formed was fired in an atmosphere of an inert gas stream at 600° C. for one hour. Then, the dried product was ground in a mortar to obtain a catalyst having a composition ratio of Pt$_{0.6}$Ir$_{0.2}$Co$_{0.2}$.

The resultant catalyst powder was suspended for two hours in 100 g of a solution of concentrated sulfuric acid (0.5 M) heated in advance to 50° C. The produced precipitate was separated by filtration and the solid consequently obtained was dried under a reduced pressure at 85° C. for 12 hours. This procedure was performed up to two repetitions to liquate cobalt on the surface of the catalyst particles and obtain catalyst particles. Thus, a catalyst comprising Pt alloy particles having an average molecular diameter of 5.0 nm and having a deposited Pt alloy concentration of 50%, a core part composition ratio of $Pt_{0.6}Ir_{0.2}Co_{0.2}$, and a shell part composition ratio of $Pt_{0.67}Ir_{0.22}Cu_{0.11}$.

Examples 33–36

Catalysts of Examples 33–36 were obtained by following the procedure of Example 32 while using carbon blacks shown in Table 2 and adjusting the amounts of their addition so as to form compositions shown in Table 2.

Comparative Example 1

The amount, 4.0 g, of a highly electroconductive carbon black (a product having a BET surface area of 280 $m^2/g$ made by Cabot Corp and sold under the trademark designation of Vulcan XC-72") and 400 g of an aqueous solution of dinitrodiamminplatinum (Pt concentration 1.0%) added thereto were stirred together for one hour. The resultant mixture and 200 g of ethanol added as a reducing agent were mixed and stirred together for one hour. The produced mixture was heated to 85° C. over a period of 30 minutes and further stirred and mixed at 85° C. for six hours and thereafter cooled to room temperature over a period of one hour.

The produced precipitate was separated by filtration and the solid consequently obtained was dried under a reduced pressure at 85° C. for 12 hours. The dried solid was ground in a mortar to obtain a catalyst comprising Pt particles having an average particle diameter of 4.5 nm and a deposited Pt concentration of 50%.

Then, this catalyst was fired in an atmosphere of an inert gas stream at 300° C. for one hour.

Comparative Example 2

Catalyst particles were obtained by following the procedure of Example 1 while omitting the treatment for liquating cobalt from the surface of catalyst particles with concentrated sulfuric acid.

Comparative Example 3

The catalyst (A) of Example 1 was mixed with an aqueous solution of cobalt nitrate and the produced mixture was dried under a reduced pressure at 85° C. for 12 hours. The dried catalyst powder consequently formed was fired in an atmosphere of an inert gas stream at 300° C. for one hour. The composition of the produced catalyst is shown in Table 1.

Comparative Example 4

Catalyst particles were obtained by following the procedure of comparative Example 1 while using Ketjen Black EC in the place of Valcan XC-72.

Comparative Example 5

The amount, 5.5 g, of a highly electroconductive carbon black (a product having a BET surface area of 800 $m^2/g$, made by Ketjen Black International Corp. and sold under the trademark designation of "Ketjen Black EC"), 8.1 g of an aqueous solution of cobalt nitrate ($Co(NO_3)_2 \cdot 6H_2O$) (Cobalt concentration 1.0%), and 400 g of an aqueous solution of dinitrodiammine platinum (Pt concentration 1.0%) were added together and stirred for one hour and then mixed with 200 g of ethanol and 1 g of sodium hydrogen boride and stirred for one hour. The resultant mixture was heated to 85° C. over a period of 30 minutes, further stirred and mixed at 85° C. for six hours, and then allowed to cool to room temperature over a period of one hour. The produced solution and 10 g of an aqueous 5% tetramethyl ammonium hydroxide solution added thereto were stirred together for one hour.

The precipitate was separated by filtration and the resultant solid was dried under a reduced pressure at 85° C. for 12 hours. Then, the dried product was ground in a mortar to obtain a catalyst comprising Pt alloy particles having an average particle diameter of 3.5 nm and having a deposited Pt concentration of 45% and a composition ratio of $Pt_{0.75}Co_{0.25}$.

Subsequently, this catalyst and 131 g of an aqueous solution of iridium chloride added thereto were mixed together and then dried under a reduced pressure at 85° C. for 12 hours. Further, the dried catalyst powder was fired in an atmosphere of an inert gas stream at 800° C. for one hour. Thus, a catalyst comprising Pt alloy particles having an average particle diameter of 7.0 nm and having a deposited Pt alloy concentration of 50% was obtained.

(Evaluation of Performance of Electrode Catalyst)

The electrode catalysts obtained in Examples 1–36 and Comparative Examples 1–5 were severally manufactured into MEAs (membrane electrode assemblies). These MEAs were tested for performance of a unit fuel cell.

(Manufacture of MEA)

The MEA was manufactured by the following procedure.

First, as a cathode, a catalyst slurry was prepared by adding an electrode catalyst obtained in each of the working examples and comparative examples, a purified water, isopropyl alcohol, and a solution containing the same amount of Nafion (registered trademark) as carbon together, thoroughly dispersing them with a homogenizer, and subjecting the resultant dispersion to a defoaming treatment. This catalyst slurry was printed in a prescribed amount by the screen printing technique on one side of a carbon paper (product of Toray sold under the product code of "TGP-H") as a gas diffusing layer (GDL) and dried at 60° C. for 24 hours. Thereafter, the surface coated with the catalyst layer was applied to an electrolytic film and they were hot pressed at 120° C. at 0.2 Mpa for three minutes to manufacture a MEA. As an anode, a MEA was manufactured by following the same procedure using a 50% Pt deposited carbon as an electrode catalyst.

In the MEA, both the anode and the cathode contained Pt in an amount of 0.5 mg per $cm^2$ of apparent electrode surface and had an electrode surface of 300 cm. Nafion 112 was used as an electrolytic film.

(Procedure of Evaluation of Performance)

The unit fuel cell consequently obtained was tested for performance as follows. During the test, hydrogen was supplied as the fuel for the anode side and air was supplied for the cathode side. These gases were both supplied under an atmospheric pressure. The hydrogen and the air were humidified to saturation respectively at 80° C. and 60° C. The temperature of the fuel cell proper was set at 80° C. The ratio of utilization of hydrogen was set at 70% and that of air at 40%. The cell was continuously operated at a current density of 0.5 $A/cm^2$ for three minutes. Prior to the stop of the power generation, the current density to be extracted was set at zero, then the anode side was purged with air for two minutes (flow rate 1 lit/minute) to expel hydrogen, the air purge was discontinued, and the cell was retained in this state for one minute.

Figure 2:
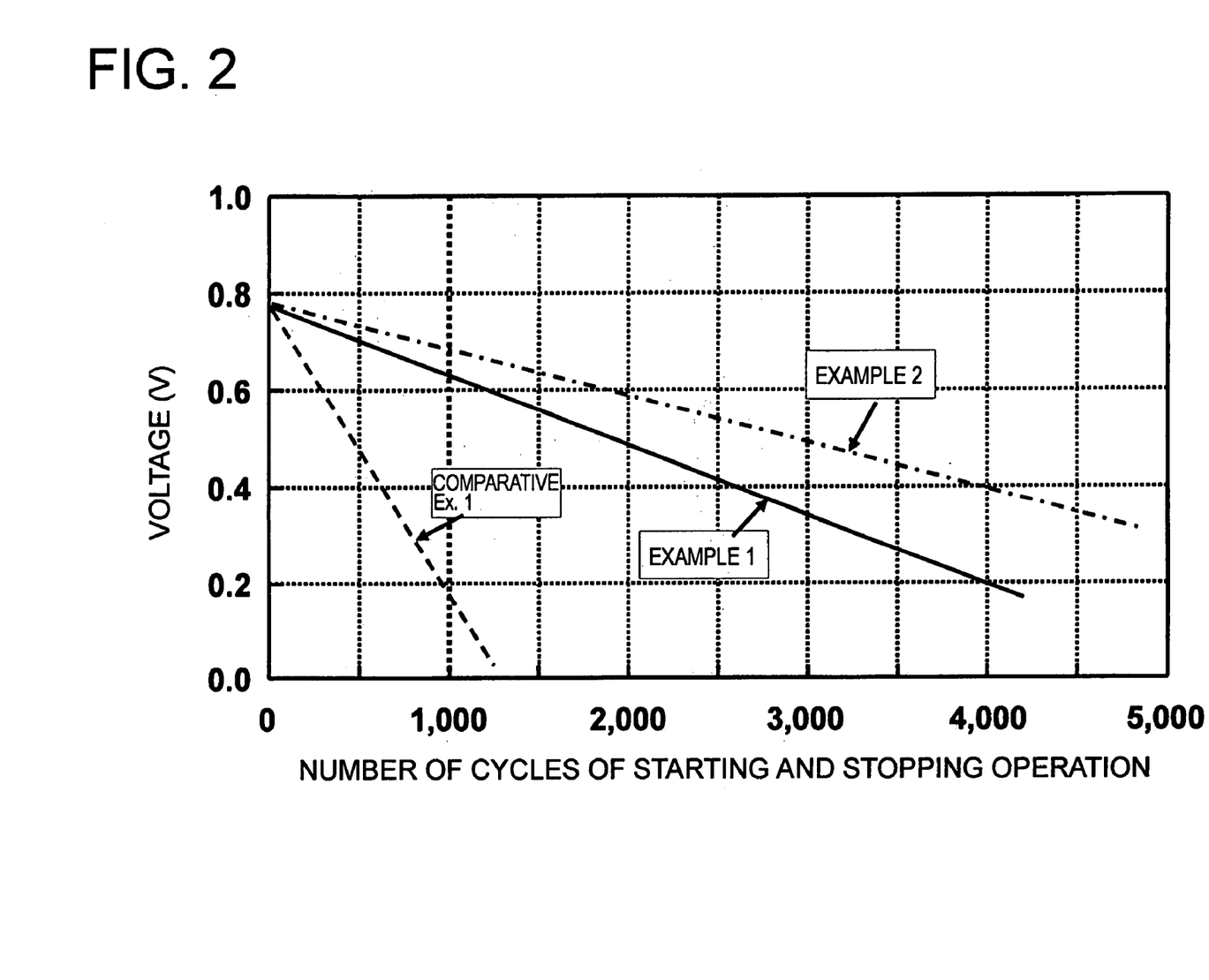
FIG. 2 is a diagram showing the results of Examples 1 and 2 and Comparative Example 1.

The cathode was opened on the outlet side into the ambient air and suspended from operation for 30 minutes. The operation of the cathode was resumed by introducing the gases into the cell under the same conditions as mentioned above and initiating generation of power. The unit fuel cell was rated for durability by performing the operation-suspension cycle up to 1,000 repetitions. FIG. 2 is a graph showing the changes of the cell voltage at a current density of 0.5 A/cm$^2$ of a solid polymer electrolytic fuel cell formed of an electrode catalyst of each of Examples 1 and 2 and Comparative Example 1 along the course of increase in the number of operation-suspension cycles.

It is clear from FIG. 2 that the fuel cells using the catalysts of this invention (Examples 1 and 2) were confirmed to have a smaller rate of decrease of the cell voltage with respect to the number of cycles of starting and stopping operation than the fuel cell using the conventional catalyst (Comparative Example 1).

TABLE 1

| | Composition | | | Carbon carrier | | Average diameter | Property Output |
|---|---|---|---|---|---|---|---|
| | Shell | Core | Average | | (m$^2$/g) | (nm) | volt. |
| Example 1 | Pt | Pt0.75Co0.25 | Pt0.9Co0.1 | KetjenblackEC | 800 | 4.0 | 0.63 |
| Example 2 | Pt | Pt0.75Co0.25 | Pt0.8Co0.2 | KetjenblackEC600JD | 1,270 | 3.5 | 0.68 |
| Example 3 | Pt | Pt0.75Co0.25 | Pt0.85Co0.15 | KetjenblackEC600JD | 1,270 | 3.5 | 0.68 |
| Example 4 | Pt | Pt0.6Ir0.3Co0.1 | Pt0.7Ir0.2Co0.1 | KetjenblackEC | 800 | 4.5 | 0.70 |
| Example 5 | Pt | Pt0.6Rh0.3Co0.1 | Pt0.7Rr0.2Co0.1 | KetjenblackEC | 800 | 4.5 | 0.72 |
| Example 6 | Pt | Pt0.75Co0.25 | Pt0.9Co0.1 | KetjenblackEC | 800 | 4.5 | 0.64 |
| Example 7 | Pt | Pt0.75Co0.25 | Pt0.9Co0.1 | VulcanXC-72 | 280 | 4.5 | 0.62 |
| Example 8 | Pt | Pt0.75Co0.25 | Pt0.9Co0.1 | Vulsaite | 77 | 5.0 | 0.55 |
| Example 9 | Pt | Pt0.75Co0.25 | Pt0.9Co0.1 | Acetyleneblack | 77 | 5.0 | 0.56 |
| Example 10 | Pt | Pt0.75Co0.25 | Pt0.9Co0.1 | blackpearl | 1,480 | 3.0 | 0.71 |
| Example 11 | Pt | Pt0.75Co0.25 | Pt0.9Co0.1 | Graphitizedblackpearl | 276 | 7.0 | 0.70 |
| Example 12 | Pt | Pt0.75Co0.25 | Pt0.9Co0.1 | GraphitizedKetjenblackEC600JD | 265 | 8.0 | 0.69 |
| Example 13 | Pt | Pt0.75Co0.25 | Pt0.9Co0.1 | GraphitizedKetjenblackEC | 125 | 10.0 | 0.68 |
| Example 14 | Pt | Pt0.75Co0.25 | Pt0.9Co0.1 | GraphitizedVulcan(XC-72) | 87 | 12.0 | 0.59 |
| Example 15 | Pt | Pt0.75Co0.25 | Pt0.9Co0.1 | Graphitized Acetylene black | 69 | 15.0 | 0.57 |
| Example 16 | Pt | Pt0.75Fe0.25 | Pt0.9Fre0.1 | KetjenblackEC | 800 | 4.0 | 0.62 |
| Example 17 | Pt | Pt0.65Ni0.35 | Pt0.85Ni0.15 | KetjenblackEC | 800 | 4.0 | 0.63 |
| Example 18 | Pt | Pt0.7Mn0.3 | Pt0.85Mn0.15 | KetjenblackEC | 800 | 4.0 | 0.62 |
| Example 19 | Pt0.75Ir0.25 | Pt0.75Co0.25 | Pt0.75Ir0.2Co0.15 | KetjenblackEC | 800 | 5.0 | 0.73 |
| Example 20 | Pt0.5Ir0.5 | Pt0.75Co0.25 | Pt0.55Ir0.30Co0.15 | KetjenblackEC | 800 | 5.0 | 0.74 |

TABLE 2

| | Composition | | | Carbon carrier | | Average diameter | Property Output |
|---|---|---|---|---|---|---|---|
| | Shell | Core | Average | | (m$^2$/g) | (nm) | volt. |
| Example 21 | Pt0.75Rh0.25 | Pt0.75Co0.25 | Pt0.75Rh0.2Co0.15 | KetjenblackEC | 800 | 5.0 | 0.73 |
| Example 22 | Pt0.75Pd0.25 | Pt0.75Co0.25 | Pt0.75Pd0.2Co0.15 | KetjenblackEC | 800 | 5.0 | 0.75 |
| Example 23 | Pt0.75Ir0.25 | Pt0.75Co0.25 | Pt0.7Ir0.2Co0.1 | KetjenblackEC | 800 | 5.0 | 0.71 |
| Example 24 | Pt0.75Ir0.25 | Pt0.75Co0.25 | Pt0.7Ir0.1Co0.2 | KetjenblackEC | 800 | 5.0 | 0.70 |
| Example 25 | Pt0.75Ir0.25 | Pt0.75Fe0.25 | Pt0.75Ir0.2Fe0.15 | KetjenblackEC | 800 | 5.0 | 0.69 |
| Example 26 | Pt0.75Ir0.25 | Pt0.75Ni0.25 | Pt0.75Ir0.2Ni0.15 | KetjenblackEC | 800 | 5.0 | 0.66 |
| Example 27 | Pt0.75Ir0.25 | Pt0.75Co0.25 | Pt0.75Ir0.2Co0.15 | VulcanXC-72 | 280 | 6.0 | 0.65 |
| Example 28 | Pt0.75Ir0.25 | Pt0.75Co0.25 | Pt0.75Ir0.2Co0.15 | Graphitizedblackpearl | 276 | 10.0 | 0.70 |
| Example 29 | Pt0.75Ir0.25 | Pt0.75Co0.25 | Pt0.75Ir0.2Co0.15 | GraphitizedKetjenblackEC600JD | 265 | 12.0 | 0.71 |
| Example 30 | Pt0.75Ir0.25 | Pt0.75Co0.25 | Pt0.75Ir0.2Co0.15 | GraphitizedKetjenblackEC | 125 | 15.0 | 0.69 |
| Example 31 | Pt0.75Ir0.25 | Pt0.75Co0.25 | Pt0.75Ir0.2Co0.15 | GraphitizedVulcan(XC-72) | 87 | 18.0 | 0.63 |
| Example 32 | Pt0.67Ir0.22Co0.11 | Pt0.6Ir0.2Co0.2 | Pt0.65Ir0.2Co0.15 | KetjenblackEC | 800 | 5.0 | 0.73 |
| Example 33 | Pt0.74Ir0.21Co0.05 | Pt0.7Ir0.2Co0.1 | Pt0.7Ir0.2Co0.1 | VulcanXC-72 | 280 | 6.0 | 0.65 |
| Example 34 | Pt0.71Ir0.24Co0.05 | Pt0.6Ir0.2Co0.2 | Pt0.65Ir0.2Co0.15 | Graphitizedblackpearl | 276 | 10.0 | 0.70 |
| Example 35 | Pt0.71Ir0.24Co0.05 | Pt0.6Ir0.2Co0.2 | Pt0.6Ir0.22Co0.18 | GraphitizedKetjenblackEC600JD | 265 | 12.0 | 0.70 |
| Example 36 | Pt0.71Ir0.24Co0.05 | Pt0.6Ir0.2Co0.2 | Pt0.6Ir0.22Co0.18 | GraphitizedKetjenblackEC | 125 | 15.0 | 0.69 |
| Com. Ex. 1 | Pt | Pt | Pt1.0 | VulcanXC-72 | 280 | 4.5 | 0.18 |
| Com. Ex. 2 | Pt0.75Co0.25 | Pt0.75Co0.25 | Pt0.75Co0.25 | VulcanXC-72 | 280 | 6.0 | 0.45 |
| Com. Ex. 3 | Co | Pt0.75Co0.25 | Pt0.2Co0.8 | VulcanXC-72 | 280 | 10.0 | 0.21 |
| Com. Ex. 4 | Pt | Pt | Pt1.0 | KetjenblackEC | 800 | 5.0 | 0.37 |
| Com. Ex. 5 | Pt0.6Ir0.2Co0.2 | Pt0.6Ir0.2Co0.2 | Pt0.6Ir0.2Co0.2 | KetjenblackEC | 800 | 7.0 | 0.51 |

The entire disclosure of Japanese Patent Application Nos. 2003-346642 and 2004-270832 filed on Oct. 6, 2003 and Sep. 17, 2004 including specification, claims, drawing, and summary is incorporated herein by reference in its entirety.

The invention claimed is:

1. A method for the production of an electrode catalyst for a fuel cell comprising a step of depositing a noble metal-containing particle formed of a noble metal alloy on an electroconductive carrier and a step of exposing the surface of said particle to aqua regia, nitric acid or concentrated sulfuric acid to liquate a component other than noble metal, thereby forming a core-shell structure in said particle.

2. A method according to claim 1, which further comprises steps of separating said electroconductive carrier having deposited thereon a noble metal-containing particle possessing a core-shell structure from said solution, washing the separated carrier, drying the washed carrier, firing the dried carrier in an atmosphere of an inert gas stream at 200–1,100° C., and further retaining the fired carrier at 200–600° C.

3. A method according to claim 1, wherein said noble metal-containing particle comprises 40–90 atomic % of platinum, 5–30 atomic % of an element represented by X and selected from the group consisting of iridium, rhodium, palladium, ruthenium, and mixtures thereof, and 5–30 atomic % of an element represented by Y and selected from the group consisting of cobalt, nickel, chromium, iron, manganese, and mixtures thereof, said core part has a platinum/Y (atomic ratio) in the range of 6/1–2/3 and said shell part has a platinum/X (atomic ratio) in the range of 6/1–2/3.

4. A method according to claim 3, wherein X in said shell part is iridium.

5. A method according to claim 3, wherein Y in said core part is cobalt.

6. A method according to claim 1, wherein the shell is substantially formed of a noble metal.

7. A method for the production of an electrode catalyst for a fuel cell comprising a step of adding a reversed micellar solution (A) containing an aqueous solution of noble metal ions in the micelle thereof and a reducing agent for the noble metal ions, a step of mixing the resultant solution with a reversed micellar solution (B) containing an aqueous solution of transition metal ions in the micelle thereof, a step of adding to the resultant solution a precipitating medium for the transition metal ions, a step of dispersing an electroconductive carrier in the solution to induce deposition of a noble metal alloy on the electroconductive carrier, and a step of exposing the resultant composite to a solution capable of liquating a component other than noble metal, thereby forming a core-shell structure in said particle.

8. A method according to claim 7, wherein said noble metal is an element selected from the group consisting of platinum, palladium, rhodium, osmium, ruthenium, iridium and mixtures of thereof and said transition metal is an element selected from the group consisting of vanadium, chromium, manganese, iron, cobalt, nickel, copper, zinc, and mixtures of thereof.

9. A method according to claim 7, wherein said reversed micellar solution (A) comprises iridium ions as said noble metal ions in the micelle thereof and the reversed micellar solution (B) comprises platinum ions as said transition metal ions in the micelle thereof.

10. A method according to claim 7, wherein said reverse micellar solution (A) comprises 40–90 atomic % of platinum, 5–30 atomic % of an element represented by X and selected from the group consisting of iridium, rhodium, palladium, ruthenium, and mixtures thereof, and 5–30 atomic % of an element represented by Y and selected from the group consisting of cobalt, nickel, chromium, iron, manganese, and mixtures thereof, said core part has a platinum/Y (atomic ratio) in the range of 6/1–2/3 and said shell part has a platinum/X (atomic ratio) in the range of 6/1–2/3.

11. A method according to claim 10, wherein X in said shell part is iridium.

12. A method according to claim 10, wherein Y in said core part is cobalt.

13. A method according to claim 7, wherein the shell is substantially formed of a noble metal.

14. A method for the production of an electrode catalyst for a fuel cell comprising a step of depositing a noble metal-containing particle formed of a noble metal alloy on an electroconductive carrier and a step of impregnating the resultant carrier sequentially in a solution resulting from adding a reducing agent to a noble metal-containing solution and/or a solution resulting from adding a precipitating medium to a transition metal-containing solution, thereby further depositing a noble metal and a transition metal on the noble metal alloy particles, thereby forming a core-shell structure in said particle, wherein said noble metal-containing particle comprises 40–90 atomic % of platinum, 5–30 atomic % of an element represented by X and selected from the group consisting of iridium, rhodium, palladium, ruthenium, and mixtures thereof, and 5–30 atomic % of an element represented by Y and selected from the group consisting of cobalt, nickel, chromium, iron, manganese, and mixtures thereof, said core part has a platinum/Y (atomic ratio) in the range of 6/1–2/3 and said shell part has a platinum/X (atomic ratio) in the range of 6/1–2/3, and X in said shell part is iridium.

15. A method for the production of an electrode catalyst for a fuel cell comprising a step of depositing a noble metal-containing particle formed of a noble metal alloy on an electroconductive carrier and a step of impregnating the resultant carrier sequentially in a solution resulting from adding a reducing agent to a noble metal-containing solution and/or a solution resulting from adding a precipitating medium to a transition metal-containing solution, thereby further depositing a noble metal and a transition metal on the noble metal alloy particles, thereby forming a core-shell structure in said particle, wherein said noble metal-containing particle comprises 40–90 atomic % of platinum, 5–30 atomic % of an element represented by X and selected from the group consisting of iridium, rhodium, palladium, ruthenium, and mixtures thereof, and 5–30 atomic % of an element represented by Y and selected from the group consisting of cobalt, nickel, chromium, iron, manganese, and mixtures thereof, said core part has a platinum/Y (atomic ratio) in the range of 6/1–2/3 and said shell part has a platinum/X (atomic ratio) in the range of 6/1–2/3, and Y in said core part is cobalt.

16. A method for the production of an electrode catalyst for a fuel cell comprising a step of depositing a noble metal-containing particle formed of a noble metal alloy on an electroconductive carrier and a step of impregnating the resultant carrier sequentially in a solution resulting from adding a reducing agent to a noble metal-containing solution and/or a solution resulting from adding a precipitating medium to a transition metal-containing solution, thereby further depositing a noble metal and a transition metal on the noble metal alloy particles, thereby forming a core-shell structure in said particle, wherein the shell is substantially formed of a noble metal.

* * * * *